United States Patent [19]

Chastonay

[11] Patent Number: 5,277,059
[45] Date of Patent: Jan. 11, 1994

[54] METHOD FOR DYNAMICALLY BALANCING GOLF PUTTERS AND OTHER IMPLEMENTS USING RADIUS OF GYRATION AS THE CONTROLLING PARAMETER

[76] Inventor: Herman A. Chastonay, 6455 Potomac, St. Louis, Mo. 63139

[21] Appl. No.: 886,342

[22] Filed: May 20, 1992

[51] Int. Cl.$^5$ ............................................. G01N 1/12
[52] U.S. Cl. .................................. 73/65.03; 273/80 A
[58] Field of Search ........................... 73/65.03, 65.06; 273/77A; 80A, 81A

[56] References Cited

U.S. PATENT DOCUMENTS

| | | | |
|---|---|---|---|
| 1,436,579 | 11/1922 | Dayton | 273/80 A |
| 1,585,190 | 5/1926 | Girdwood | 273/80 A |
| 1,594,801 | 8/1926 | Stackpole | 273/77 A |
| 2,066,962 | 1/1937 | Cross | 273/80 A |
| 3,679,207 | 7/1972 | Florian | 273/80 A |
| 3,698,239 | 10/1972 | Everett, III | 73/65.03 |
| 4,058,312 | 11/1977 | Stuff et al. | 73/65.03 |
| 4,203,598 | 5/1980 | Stuff et al. | 273/77 A |
| 4,461,479 | 7/1984 | Mitchell | 273/81 A |
| 4,674,324 | 6/1987 | Benoit | 73/65 |
| 4,674,746 | 6/1987 | Benoit | 273/81 A |
| 4,866,979 | 9/1989 | Bernhardt | 73/65.03 |
| 4,988,102 | 1/1991 | Reisner | 273/81 A |
| 5,094,101 | 3/1992 | Chastonay | 73/65 |

OTHER PUBLICATIONS

Article from *Golf Scene*, dated Oct./Nov. 1991, entitled "Center of Gravity" by Ralph Maltby, pp. 16 and 17.

*Primary Examiner*—Donald O. Woodiel
*Attorney, Agent, or Firm*—Haverstock, Garrett & Roberts

[57] ABSTRACT

A method for dynamically balancing golf putters using radius of gyration as the controlling parameter wherein the center of precussion location on the putter club face is re-located so as to coincide with that location where a golfer consistently makes contact with a golf ball during that golfer's natural putting stroke. The present method also allows one to reposition the golf ball contact point on the putter club face to an optimum location such that the golfer will consistently strike a golf ball at or slightly above its horizontal centerline thereby imparting optimum role characteristics to the golf ball when putting. The present method is based upon the dynamic equations describing compound pendulum motion and uses radius of gyration as the controlling parameter to balance a golf putter based upon optimal putter comfort, feel and performance during the putting stroke. The present method allows one to match a golfer's natural putting stroke to a particular golf putter modified so as to both contact the golf ball at its optimal location for best distance, direction and roll characteristics while also optimizing and improving the overall feel, comfortability, performance and control of such putter during the putting stroke. Although the present invention is specifically directed to dynamically balancing golf putters, it is also recognized that the present method can likewise be utilized for balancing other hand held implements as hereinafter explained.

11 Claims, 3 Drawing Sheets

CENTER OF PERCUSSION    CENTER OF GRAVITY

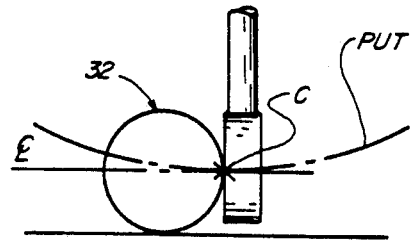
Fig. 5(a)
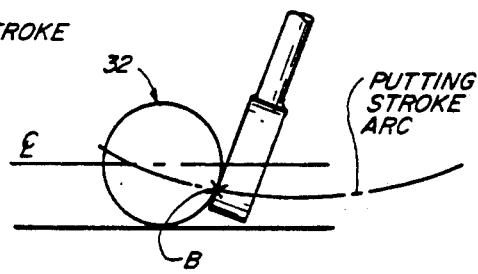
Fig. 5(b)
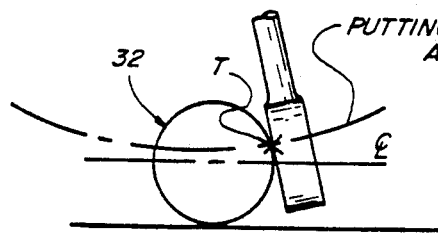
Fig. 5(c)
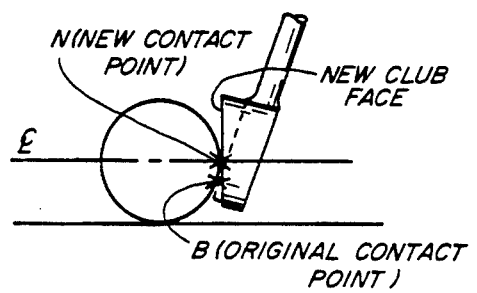
Fig. 6
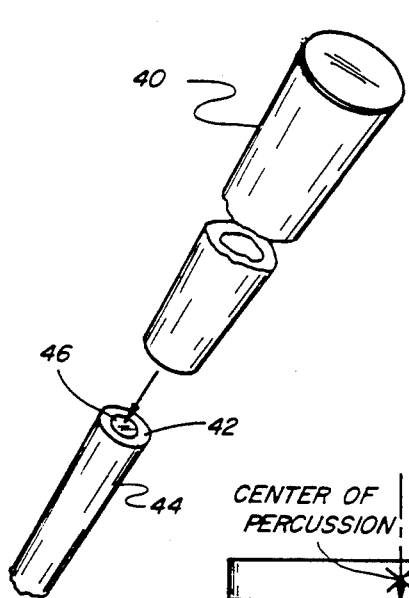
Fig. 8
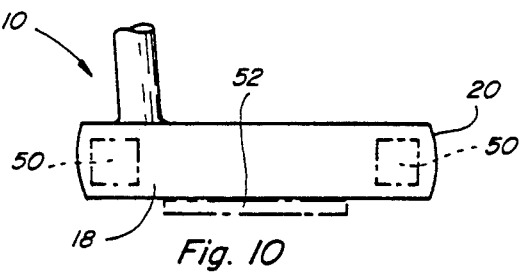
Fig. 10
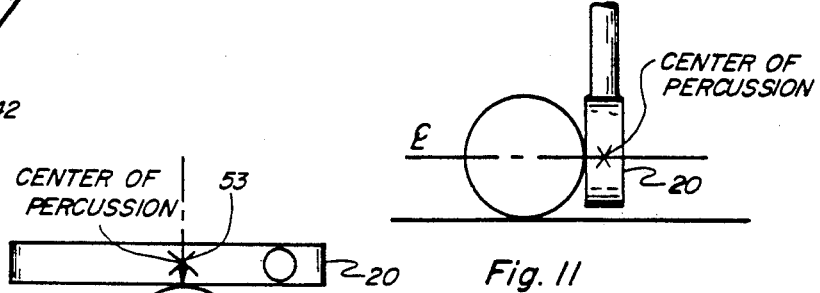
Fig. 11
Fig. 12

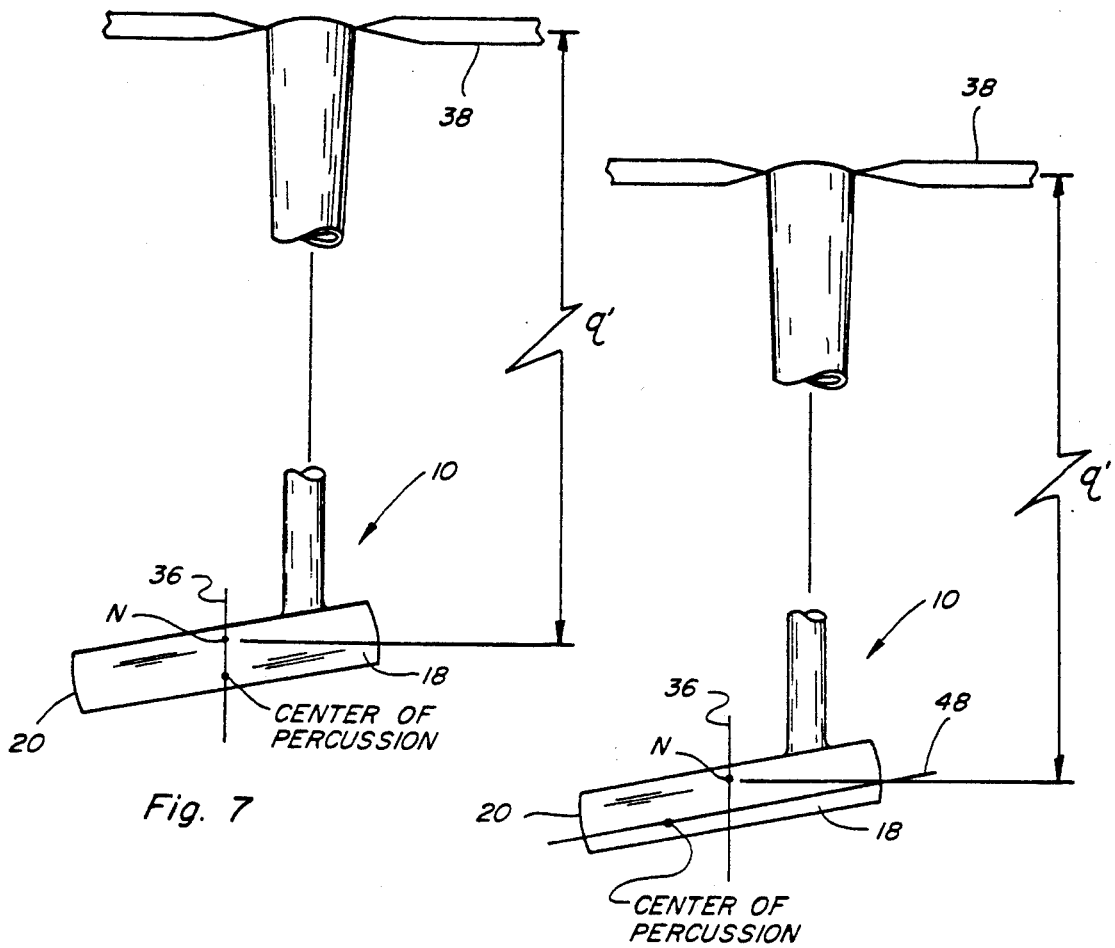
Fig. 7
Fig. 9
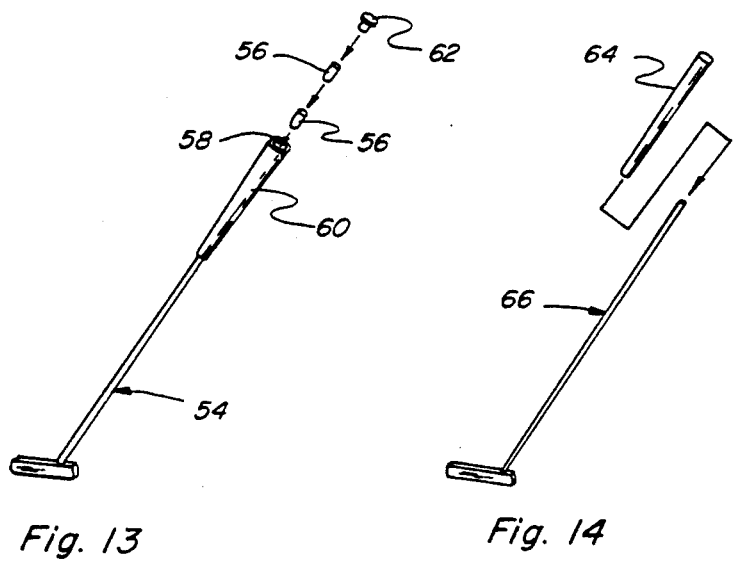
Fig. 13
Fig. 14

METHOD FOR DYNAMICALLY BALANCING GOLF PUTTERS AND OTHER IMPLEMENTS USING RADIUS OF GYRATION AS THE CONTROLLING PARAMETER

The present invention relates to a method for balancing golf putters and other implements and, more particularly, to an improved method for dynamically balancing a golf putter to a particular radius of gyration based upon determining the center of percussion location of the putter on the club face, determining where on the club face a particular golfer makes contact with the golf ball during that golfer's natural putting stroke, and thereafter aligning the center of percussion location with the golfer's actual golf ball point of contact location on the club face. The present method also enables one to reposition the golf ball contact point, if necessary, to an optimum location on the club face which imparts the best distance, direction and roll characteristics to the golf ball. By co-locating the center of percussion location with a particular golfer's optimum golf ball contact location on the club face, a golfer imparts optimum roll characteristics to the golf ball when putting using that golfer's natural putting stroke.

Since compound pendulum motion takes into account the important dynamic characteristics of balancing a golf club, and since radius of gyration, moment of inertia, the mass or weight of a particular golf club, the center of gravity location, and the center of percussion location of a particular club are all interrelated in the dynamic equations describing compound pendulum motion, using radius of gyration as the controlling parameter for balancing a golf putter provides for a more accurate dynamic balancing of such club as compared to other known balancing methods which are all tied to static parameters and which, importantly, do not co-locate the center of percussion of the putter club face with the actual point of contact of such club face with the golf ball. Such alignment provides a method for matching a golfer's natural stroke to a particular club modified so as to contact the golf ball at its optimum location for best distance, direction and roll characteristics. The present method also enables one to balance a golf putter to a particular radius of gyration based upon optimum comfort, feel and performance during the putting stroke. Although the present invention is specifically directed to dynamically balancing golf putters, it is also recognized and anticipated that the present method can likewise be utilized for balancing any golf club within a particular set of clubs as well as other hand held implements such as baseball bats, hammers, axes, gardening equipment and other tools as will be hereinafter explained.

BACKGROUND OF THE INVENTION

Putting is an object of great concern among golfers as the game of golf is designed such that to complete a round of golf (18 holes) with a regulation score of par, approximately one half of all strokes in the par round are allocated to putting. Putting is a unique element of the game of golf, requiring a totally different stroke and set of skills as compared to the swinging motion required for driving and hitting the golf ball with other golf clubs such as woods and irons. The putt is also one of the most troublesome elements of golf as the ideal putting stroke requires very precise and repeatable or grooved stroke dynamics to enable the golfer to impart an exact amount of force to the golf ball and direct the ball along a desired line the required distance to the hole.

Two important problems face golfers in achieving the ideal putting stroke. First of all, it is important that the golf ball be struck at or near its horizontal centerline so as to impart optimum roll dynamics to the ball as will be hereinafter further explained. Secondly, it is important to contact the golf ball at the center of percussion location on the club face because, as explained hereinafter, contacting the golf ball with the face of the putter away from or out-of-alignment with the center of percussion thereof will impart a torsional or twisting motion to the club face which will result in poor performance. Poor putting performance translates into a putt which is too long or too short, a putt which is off line, or a putt in which the golf ball skips or bounces to some degree instead of having a smooth roll. These two factors contribute the most to poor putting and not only negatively affect the outcome of the putt, but, more importantly, they affect the golfer's putting consistency as well as the golfer's confidence level. This negative affect on the outcome of the putt is compounded by the very fact that the size and weight of the golf ball is such that it will react to any obstruction within its path such as the grain of the grass, bare spots, spike marks, wind, moisture and any sand or dirt particles which may lie within its path. Striking the ball incorrectly with the putter face away from the center of percussion of the putter can also give the putt a dead or otherwise poorly hit feeling. As a result, golf putters come in all shapes, sizes, styles and weights in an effort to alleviate these problems.

Numerous apparatus and methods have been directed to balancing golf clubs to improve the feel and performance of the golf swing. For instance, Benoit U.S. Pat. Nos. 4,674,324 and 4,674,746 disclose a golf club swing weighting method wherein a set of golf clubs consisting of a variety of different woods and irons can be balanced such that all clubs have the same static moment associated with the optimum moment of inertia preferred by the golfer. The Benoit method includes varying the radius of gyration of each golf club so as to enable the center of percussion of each such club to remain in the club head while the resulting static moment associated with an individual golfer's optimum moment of inertia is then held constant and matched to all clubs in the set. The Benoit method is limited, however, as the controlling parameter, namely, the resulting static moment, is still a static parameter. The Benoit method is further limited as it is not specifically adaptable for use in balancing putters.

Other known prior art balancing methods disclose adding weight to a golf club to influence performance and feel, namely, adding weight to the grip end of the club. For instance, Mitchell U.S. Pat. No. 4,461,479 discloses a golf club having a weighted handle which moves the balance point of the golf club closer to the grip end for improving accuracy and control when swinging the club Reisner U.S. Pat. No. 4,988,102 discloses a weighted golf grip for balancing a golf club wherein a weight assembly is added to the grip of a golf club at the furthest point opposite the club head behind the golfer's hands. This is done to move the fulcrum point or center of gravity of the club closer to the grip end to provide greater control over the club during the swinging motion. Contrasted to the present method for dynamically balancing a golf putter using radius of gyration as the controlling parameter, the known prior art methods make no effort to align the center of percussion location with the actual golf ball contact point on the club face nor do such prior art methods specifically address the dynamic balancing of golf putters. Also, importantly, all such known prior art methods are tied to static parameters which alone do not provide accurate means for replicating dynamic feel and performance.

Still other prior art balancing methods disclose means for adding weight to the grip end of a golf club to compensate for the tendency of the club head to pull the golf club down and away from the desired swing path. For instance, Stuff et al U.S. Pat. No. 4,203,598 discloses a balancing method for a golf club based on the Parameters of total club weight, center of gravity length and true swing weight of the club, which true swing weight is to be matched to the swing weight of other clubs in a particular set, and wherein a relatively small component weight $W_x$ is also added at the grip end of the club at a radially displaced location from the center of the club shaft to compensate for forces which tend to move the shaft of the golf club downwardly and out of the swing plane. This method is again tied to static parameters and likewise avoids and/or circumvents the dynamic characteristics of a golf club. The Stuff et al method does not incorporate the important dynamic Parameter of radius of gyration into its balancing methodology, nor does it disclose a method for specifically balancing golf putters. Other prior art balancing methods are also discussed in Applicant's U.S. Pat. No. 5,094,101, which patent addresses a method for dynamically balancing golf clubs other than putters.

Contrasted to the relatively limited known weighting and balancing methods and apparatus discussed above, the present invention relates to a method specifically directed to dynamically balancing a golf putter so that it has both a desired radius of gyration and a center of percussion location that will provide optimal performance, feel and putting capability to a particular user of such putter. The present method allows a golfer to obtain maximum power and a truer directional roll by modifying the putter to fit the golfer's natural putting stroke instead of changing the golfer's putting stroke to conform to the particular shape, style, weight and characteristics of the putter being used.

SUMMARY OF THE INVENTION

The present invention teaches a method for dynamic balancing golf putters as well as other hand held implements using a Particular radius of gyration selected by the golfer or user to Provide superior performance, comfort, and feel during the putting stroke or swing motion and, importantly, which enables repositioning of the center of percussion of the putter to a location on the club face which coincides with the optimum point of contact of such club face with the golf ball so as to impart the best distance, direction and roll characteristics to such ball. The present method is based upon the assumption that the putting motion corresponds to the motion of a compound pendulum, that is, the putter, when free to rotate and swing under the influence of gravity about a fixed horizontal axis not passing through the center of gravity of such putter, will move and swing as a compound pendulum. Since compound pendulum motion best simulates the Putting stroke for dynamic balancing purposes, the dynamic equations for describing such motion as set forth below and as further discussed in Applicant's U.S. Pat. No. 5,094,101 are used in the present method for dynamically balancing golf putters. The Present method is also based upon the observation that the optimum roll characteristics which can be imparted to a golf ball during the putting stroke occurs when the putter club face strikes the golf ball at or slightly above the horizontal centerline of the ball as viewed when the golfer addresses the golf ball and lines up the putt.

It has been further observed that the optimal location on a putter head for striking a golf ball corresponds to a location on the head face known as the center of percussion. The center of percussion is defined as that point located on the club face at which a body free to move as a compound pendulum about an axis of rotation can be struck so that the only motion imparted to the body will be a purely rotational motion around the body's axis of rotation. These concepts are more fully discussed and explained in Applicant's U.S. Pat. No. 5,094,101. Based upon the above assumption and observation, striking a golf ball with a putter using a compound pendulum motion at a location on the putter head face corresponding to the center of percussion will impart a force to the golf ball which will be tangential to the arc of the pendulum motion of the putter and which will direct the golf ball along a truer line corresponding to the intended direction for the Putt. Striking a golf ball at locations on the face of the putter head not corresponding with the center of percussion location, even though using the same putting stroke, can produce widely varying results as well as different feedback or feel. Also, striking the ball with the putter head at different orientations can produce still more variations in performance and feel.

It is therefore advantageous to stroke the golf ball at or slightly above its horizontal centerline and at the center of percussion location of the putter club face. As a result of this analysis, it is advantageous to use a putter having its center of percussion located on the putter club face at that point where the golfer strikes the golf ball. It is even more advantageous to use a putter having its center of percussion on the putter club face at that point where the golfer strikes the golf ball at or slightly above the ball's horizontal centerline. If the golfer's point of contact with the golf ball on the club face does not coincide with the center of percussion location, it is the objective of the present method to dynamically balance such putter so as to align these two locations on the putter club face using radius of gyration as the controlling parameter for accomplishing this relocation.

The first step associated with the present method is to have a golfer select a particular golf putter which meets that Particular golfer's needs and preferences, namely, a putter having as many optimal parameters and performance characteristics as possible for that particular golfer, such parameters including ease and comfortability with respect to swing as well as performance and control of that particular putter. This may be accomplished through the use of a plurality of trial putters each having a different radius of gyration and other characteristics, or the particular golfer may have his/her own preferred putter which he/she desires to have balanced in accordance with the present invention to achieve better overall performance and control. Once the golfer is satisfied with the performance and feel of a Particular putter, the center of gravity location, the weight, and the center of percussion location can be obtained using known weighting and measuring means. The radius of gyration of this particular reference putter can now be determined from the center of percussion length and the center of gravity length using the following equation derived from the theory of dynamics of a rotating body:

$$q = K^2/r \text{ or } K = \sqrt{q \times r} \qquad \text{(Equation 1)}$$

wherein:
K = radius of gyration of the putter;
q = length from the center of percussion of the putter to the grip end axis of rotation; and
r = length from the center of gravity of the putter to the grip end axis of rotation.

In other words, that point located at the distance "$K^2/r$" from the axis of rotation is the center of percussion as best shown in FIG. 1. Since both the center of percussion length and the center of gravity length are known, the radius of gyration for the reference putter can be calculated.

Once the radius of gyration for the referenced putter is known, that point on the putter club face where that particular golfer makes contact with the golf ball during the putting stroke is determined through experimentation as will be hereinafter further explained. If the golfer is not contacting the golf ball at the optimum location, namely, at or slightly above the horizontal centerline of the golf ball, the putter club face can be angularly oriented to achieve this end. Once this new golf ball contact point location is determined, this location is compared with the center of Percussion location for that putter as modified. If the golfer's point of contact with the golf ball on the putter club face does not coincide with the center of percussion location, the center of percussion can be moved up or down on the club face by determining the distance from the grip end axis of rotation to the new adjusted golf ball contact point and using this distance as the value for "q" in Equation 1 above. Using this new value for the center of percussion length "q", and holding the radius of gyration constant based upon the value previously determined for the reference putter, one can now calculate the new center of gravity location for the reference putter based upon the selected radius of gyration value and the new selected center of percussion length. Once the new center of gravity location is calculated, the reference putter can be weighted and balanced about its new center of gravity location thereby producing a putter which is weighted and balanced to the same radius of gyration of such putter prior to relocation of its center of percussion. Since the radius of gyration was held constant, the re-balanced putter has the same desired, optimal performance and feel as before, but, importantly, it now has its center of percussion location re-aligned so as to coincide with that point on the putter club face where the golfer makes contact at or slightly above the centerline of the golf ball during the putting stroke.

It is also recognized and anticipated that the present balancing method can be utilized by having a golfer select one or more trial putters based upon the golfer's particular putting style and/or corresponding to that golfer's existing or permanent putter, the trial putter or putters being weighted and balanced differently so as to have their respective centers of percussion at different locations on the club face. Also, the trial putters may have various putter head configurations and/or weighting as well as different club head angles so as to vary the point of contact of the club face with the golf ball. Also, importantly, it is recognized that each of the trial putters may include means to change the angular orientation of the putter club face relative to the vertical so as to achieve optimum golf ball contact at or slightly above its horizontal centerline as previously explained. The golfer can then experiment with the trial putters by actually putting a number of golf balls and can vary or adjust the angle of the club face until a trial putter having a desired, optimal performance and feel is found. Once this optimal performance and feel is individually selected for a particular golfer, the center of percussion location as well as the center of gravity location can be measured and determined as previously discussed. Thereafter, the radius of gyration of the selected trial putter can be determined using Equation 1 above and the golfer's permanent putter can then be balanced to that particular radius of gyration and center of percussion location. The permanent putter will then perform and feel just like the trial putter and, importantly, the permanent putter will have its club face weighted and angled so as to correspond to the trial putter such that the center of percussion location and the actual golf ball contact point are co-aligned.

Replicating the exact performance and feel of the selected trial putter is facilitated by knowing the moment of inertia of the trial putter. The radius of gyration of the mass of any particular body with respect to an axis is defined as that distance from the axis at which the entire mass of the body can be imagined to be concentrated and still have the same moment of inertia that the body has in its actually distributed form. This means that the moment of inertia of a putter can be defined in terms of its radius of gyration and mass using the following equation:

$$I = K^2 m \qquad \text{(Equation 2)}$$

where:
I = moment of inertia
K = radius of gyration
m = mass or weight of the putter It is therefore a principal object of the present invention to provide an improved method for dynamically balancing a golf putter to an individually selected radius of gyration, which radius of gyration provides optimal performance and feel to a particular golfer during his/her putting stroke.

Another object is to provide a dynamic balancing method wherein the center of percussion of a golf putter can be repositioned so as to correspond to a location on the putter club face where a golfer consistently strikes the ball.

Another object is to provide a dynamic balancing method wherein the actual putter club face contact point with the golf ball can be changed so as to achieve optimum roll characteristics.

Another object is to enable a golfer to experimentally determine an optimal radius of gyration for putting using a trial putter, and thereafter balance a permanent putter of any desired configuration to the same optimal radius of gyration of the trial putter.

Another object is to provide a method for optimizing and improving the feel and performance characteristics of any putter.

Another object is to provide a method for dynamically balancing golf putters which also improves the static parameters of the putter.

Another object is to teach a method for dynamically balancing golf putters which utilizes a plurality of trial putters that cover a wide range of putter balances and club face angles that will fit the optimal performance and feel characteristics of a majority of golfers including means for adjusting the club face angle.

Another object is to teach a method for dynamically balancing any hand held implement by co-locating the center of percussion of the implement with the actual contact or impact point of such implement with its intended object.

These and other objects and advantages of the present invention will become apparent to those skilled in the art after considering the following detailed specification in conjunction with the accompanying drawings.

BRIEF DESCRIPTION OF THE DRAWINGS

FIG. 5((a) is a partial front elevational view showing a conventional putter head in proper position during the putting stroke for contacting a golf ball at or slightly above its horizontal centerline;

FIG. 5(b) is a partial front elevational view showing a conventional Putter head striking a golf ball below its horizontal centerline during a putting stroke;

FIG. 5(c) is a partial front elevational view showing a conventional putter head striking a golf ball above its horizontal centerline during a putting stroke;

FIG. 6 is a partial front elevational view showing the putter head of FIG. 5(b) modified so as to move the actual golf ball contact point on the putter club face to an optimal location for allowing a golfer to make contact with the golf ball at or slightly above its horizontal centerline;

FIG. 7 is an enlarged fragmentary elevational view of the Putter of FIGS. 1 and 2 illustrating a vertical displacement between the center of percussion location and the optimal golf ball contact point on the club face;

FIG. 8 is an exploded perspective view illustrating one means for adding permanent weights to the grip portion of a permanent putter according to the present invention;

FIG. 9 is an enlarged fragmentary elevational view of the putter of FIGS. 1 and 2 illustrating both a horizontal as well as a vertical displacement between the center of Percussion location and the optimal golf ball contact point on the club face;

FIG. 10 is a partial rear elevational view of the putter head of FIG. 2 showing in phantom lines possible locations for adding additional weight thereto;

FIG. 11 is a partial side elevational view of the putter of FIGS. 1 and 2 balanced in accordance with the present method such that the center of percussion of the putter will consistently strike the golf ball at its horizontal centerline location;

FIG. 12 is a partial top planform view of the putter and golf ball illustrated in FIG. 11;

FIG. 13 is a perspective view of a trial putter constructed according to the teachings of the present invention showing one means for adding a plurality of temporary weights thereto; and FIG. 14 is a perspective view of another trial putter constructed according to the teachings of the present invention showing alternative means for attaching temporary weights thereto.

DETAILED DESCRIPTION OF THE INVENTION

Golfers have individual and instinctive putting methods, styles and techniques. Learning a better method of putting a golf ball will help for a time but the tendency of the golfer is to return to his/her instinctive putting stroke, especially under the stress of competition. The present method for dynamically balancing a golf putter centers around the golfer's individual and instinctive style of putting and involves changing structural characteristics of the putter to match the golfer's individual and natural style of putting as compared to changing the golfer's putting style and stroke to conform to the particular structural characteristics and balance of the putter being used.

Figure 1:
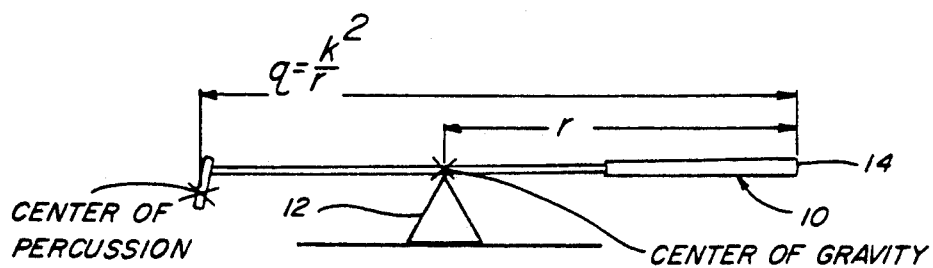
FIG. 1 is a side elevational view illustrating the positioning of a typical golf putter on a fulcrum device for determining the center of gravity of such putter.

The first step in the present method involves having a golfer select a putter having a configuration and feel which best fits that particular golfer's putting style and stroke and which the golfer finds desirable. The putter so selected should include the optimal performance and feel characteristics for that particular golfer based upon that golfer's natural putting style and putting stroke. This selected or reference putter may be the permanent putter of the particular golfer, or it may be one selected by the golfer through the use of a plurality of trial putters each having a different configuration and feel as will be hereinafter further explained. Regardless of how one arrives at the selected reference Putter, once such reference putter has been found, the center of gravity length "r" and the center of percussion length "q" are determined by known means. The center of gravity may be found by placing the selected reference putter such as the putter 10 illustrated in FIG. 1 on a balancing device such as the fulcrum device 12. The center of gravity of the reference putter 10 is that point along the shaft length at which the reference putter can be balanced on the fulcrum 12 as illustrated in FIG. 1. The center of gravity length "r" is equal to that distance from the center of gravity of the reference putter to the grip end axis of rotation. The axis of rotation is located at the grip end 14 as more fully explained in Applicant's U.S. Pat. No. 5,094,101.

Figure 2:
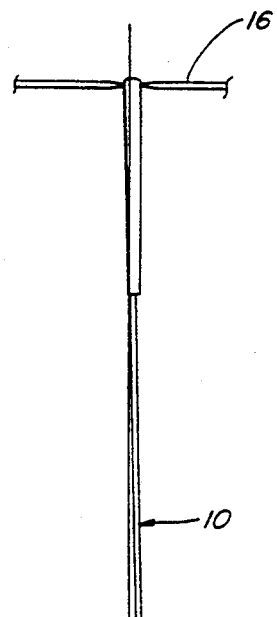
FIG. 2 is a front elevational view of the putter of FIG. 1, the putter being supported in a pivotal orientation for determining the location of its center of percussion.
Figure 3A:
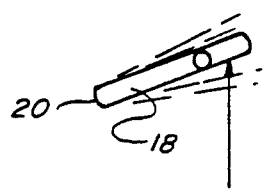
FIGS. 3(a), 3(b) and 3(c) are each cross-sectional views taken along the line 3—3 of FIG. 2 illustrating movement of the putter head when struck to the right of, to the left of, and at, respectively, the location on the putter club face corresponding to the center of percussion of such putter.
Figure 3B:
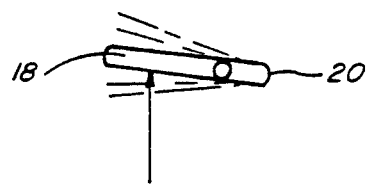
Figure 3C:
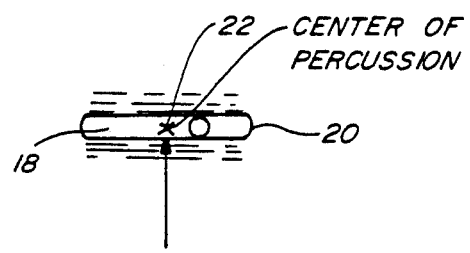

The center of percussion length "q" for the selected reference putter can be measured based upon the grip end axis of rotation point discussed above. For the reference putter 10 having a known center of percussion location, the distance designated by the letter "q" from the center of percussion to the grip end axis, as shown in FIG. 1, is measured. For a reference putter wherein the location of the center of percussion is not known, such location must be determined by known means. The location of the center of percussion of any golf putter can be determined in the following manner. First, the selected putter such as the putter 10 is pivotally suspended about a horizontal axis 16 at the pivot Point selected such as that point shown in FIG. 2. When so suspended, the club face 18 of the putter head 20 can be tapped or otherwise contacted so as to impart a pivotal motion about the horizontal axis of suspension 16. Tapping the putter face 18 at different locations will produce different pivotal movements of the putter head 20 such as illustrated in FIGS. 3(a), (b) and (c), such pivotal movements determining the center of percussion at the location lengthwise on the putter face 18 as will be hereinafter explained. For instance, FIG. 3(a) shows how the putter head 20 would move when struck on the putter face 18 to the right of the center of percussion; FIG. 3(b) shows how the putter head 20 would move when struck to the left of the center of percussion; and FIG. 3(c) shows how the putter head 20 would move when struck on the putter face 18 at a location corresponding to the center of percussion. It is important to note that striking the putter face 18 either left or right of the center of percussion will also cause a twisting or tortional motion to occur. Only when the putter face 18 is struck at the center of percussion location will the resulting movement be purely rotational or straight back about the horizontal axis 16 as shown in FIG. 3(c). When the putter face 18 is struck such that the only motion imparted to the putter head 20 is rotational or straight back motion about the axis 16, this location, identified as 22 in FIG. 3(c), corresponds to the center of percussion for the selected putter.

When the center of gravity length "r" and the center of Percussion length "q" for the selected reference putter have been measured, the radius of gyration and the moment of inertia of the reference putter can be calculated using Equations 1 and 2 above. This establishes the radius of gyration value to which the golfer's permanent putter will be balanced as hereinafter explained. The selected reference putter may be the permanent putter of the golfer which is to be balanced in accordance with the present method, or it may be a selected trial putter as will be hereinafter explained. For purposes of explaining the present balancing method, it will be assumed that the selected reference putter is the putter to be balanced in accordance with the present method unless otherwise specified herein.

Figure 4B:
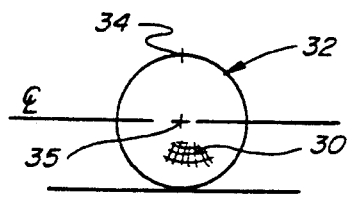
FIG. 4(b) is a front elevational view of a golf ball illustrating the markings made thereon by striking it with a putter club face having carbon paper thereon as shown in FIG. 4(a)
Figure 4A:
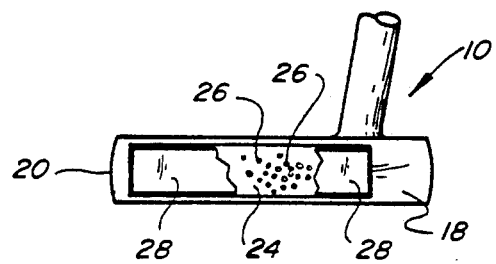
FIG. 4(a) is an enlarged partial front elevational view of the putter of FIG. 2 illustrating the use of impact tape and carbon paper on the club, face.

The next step in the present method is to determine both where on the golf ball the golfer consistently hits the ball and where on the putter club face the golfer consistently makes contact with the golf ball during the golfer's putting stroke. To determine where the golfer normally strikes the golf ball on the club face of the selected putter, means such as impact tape 24 can be adhered to the putter face 18 as best shown in FIG. 4(a). The impact tape 24 will produce a mark thereon when a golf ball is struck thereby. The golfer can then putt a number of golf balls with the putter 10 and observe the various locations of contact 26 indicating where on the impact tape 24 the numerous golf balls have been struck. Additionally, means such as carbon paper 28 can likewise be adhered to the putter face 18 over the impact tape 24 so as to leave a mark such as at 30 on a golf ball 32 which is struck by the carbon paper 28 as shown in FIG. 4(b). When conducting this Putting exercise, it is important that the golf 1 32 be positioned in the same, identical orientation prior to each putt. This can be accomplished by placing orientation marks such as the marks 34 and 35 on the ball 32 and always positioning the marks 34 and 35 in the same location relative to the ground and/or the golfer prior to each putt as illustrated in FIG. 4(b). The mark 34 orients the top portion of the ball 32 whereas the mark 35 orients the centerline or equator of the ball.

As previously indicated, optimum roll dynamics are imparted to the golf ball when it is struck at or near its horizontal centerline as shown in FIG. 5(a). Striking the golf ball 32 at or slightly above its horizontal centerline such as at point C illustrated in FIG. 5(a) not only transfers maximum kinetic energy from the club face to the ball but, more importantly, it immediately starts the ball rolling along its intended direction for the putt. It is important to remember that the force imparted to the golf ball will be tangential to the arc of the pendulum motion of the putter during the putting stroke. In this regard, maximum force is transferred to the golf ball when the ball is struck at the bottom of the arc inscribed by the putting stroke. If the golfer's putting swing is such that the golf ball is struck below the centerline of the ball such as at the contact point B illustrated in FIG. 5(b), such contact with the ball 32 will actually lift the ball off of the putting surface and allow it to skip and hop before it dampens out into a smooth roll. This type of contact with the golf ball generally occurs when the golfer's swing is such that the club face makes contact with the ball on the upswing side of the putting stroke as illustrated in FIG. 5(b). This allows some of the kinetic energy imparted to the ball to be utilized in lifting the ball and therefore detracts from both the speed and directional control imparted to the ball.

Similarly, if the putter club face makes contact with the golf ball above its horizontal centerline as illustrated in FIG. 5(c), the force imparted to the ball will initially drive the ball into the putting surface causing the ball to initially hop and skip before it dampens out into a smooth roll. This likewise detracts from both the speed and directional control imparted to the golf ball during the putting stroke. This type of ball contact generally occurs when the golfer's putting stroke is such that the putter club face makes contact with the ball during the downswing portion of the putting stroke as illustrated in FIG. 5(c), although such contact may also occur during the upswing portion of a particular golfer's swing. In any event, it is obvious that optimum roll characteristics will be imparted to a golf ball during the Putting stroke when the Putter club face strikes the golf ball at or slightly above the horizontal centerline of the ball as illustrated in FIG. 5(a). Hitting the golf ball at this optimum location imparts the best distance, direction and roll characteristics to the ball.

Once the golf ball contact point on the putter club face where a particular golfer consistently strikes the ball is determined, and once the particular location on the golf ball itself where a golfer consistently strikes the ball is determined through the experimental method described above, the following analysis is made. First of all, if the putting stroke of a Particular golfer is such that the golfer consistently strikes the golf ball either above or below the optimum horizontal centerline as illustrated in FIGS. 5(b) and 5(c), then an adjustment must be made to the putter club face so as to enable the natural putting stroke of the golfer to contact the golf ball at the optimum location, namely, at or slightly above its horizontal centerline as illustrated in FIG.

5(a). This means that the putter club face must be angled appropriately to achieve this end. For example, if the golfer consistently strikes the golf ball 32 below its horizontal centerline as illustrated in FIG. 5(b), then the putter club face must be angularly oriented as shown in FIG. 6 such that the golfer's natural putting stroke will now allow the newly oriented club face to make contact with the golf ball 32 at its new contact point N which is located at or slightly above the horizontal centerline of the ball 32. Since the actual point of contact of the putter club face with the golf ball differs with each individual golfer depending upon the golfer's particular Putting style and arc of swing as well as the height of the putter club face above the putting surface, it is possible to angularly orient the putter club face anywhere in the range of $-10°$ to $+10°$ relative to the vertical. The correct angular orientation of the putter club face is determined through experimentation such as by reconfiguring the putter club face at a predetermined angular orientation and then having the particular golfer putt a number of golf balls using impact tape and carbon paper as previously explained to determine the respective points of contact on the club face and the golf ball. It is also anticipated that a series of trial putters having means associated therewith to change the angular orientation of the putter club face relative to the vertical so as to achieve optimum contact at or slightly above the horizontal centerline of the golf ball may likewise be utilized as Previously explained to accomplish this end. In any event, once the correct angular orientation of the putter club face is determined, the club face of the selected putter is angularly oriented accordingly by any suitable means and the new golf ball contact point on the club face is noted.

We are now ready to compare the new golf ball contact point on the putter club head with the center of percussion location of such club face. Since the putter club face has now been angularly oriented to move the actual golf ball contact point to an optimum location, the center of percussion of this newly configured putter may be determined as previously explained. The center of percussion location on the club face is now compared to the actual golf ball contact point just determined. If these two locations do not coincide, then we need to re-balance the putter in accordance with the present method so as to reposition the center of percussion to a location on the club face which coincides with the point of contact of such club face with the golf ball as previously determined. This is accomplished using Equation 1 above as follows.

If the golfer's point of contact with the golf ball on the Putter club face does not coincide with the center of percussion location and the center of percussion location and the golf ball contact point N are as illustrated in FIG. 7, the center of percussion can be moved up or down on the club face along the vertical axis 36 by determining the distance "q'" from the grip end axis of rotation 38 to the new adjusted golf ball contact point N and using this distance as the value for "q" in Equation 1 above. Using this new value "q'" for the center of percussion length, and holding the radius of gyration constant based upon the value previously determined for the reference putter, one can now calculate the new center of gravity location "r" for the reference putter based upon the selected radius of gyration value and the new selected center of percussion length. Once this new center of gravity length "r" is calculated, the new center of gravity location can be determined and the reference putter can be weighted and balanced about this new center of gravity location. This balancing is achieved as previously discussed in Applicant's U.S. Pat. No. 5,094,101 by generally adding trial weights adjacent the grip end portion of the club in order to balance such club in equilibrium about the new center of gravity location. If the reference putter is being balanced without the grip member attached thereto, a substitute weight simulating the weight of the grip member is positioned on the club shaft at the appropriate location prior to balancing as explained in Applicant's U.S. Pat. No. 5,094,101. Once the putter is balanced as just described, a single permanent weight equal to the trial weight or any equivalent weight arrangement is positioned and secured preferably inside the club shaft at the same location as the trial weight as fully set forth and explained in Applicant's U.S. Pat. No. 5,094,101. The trial weight is then removed and the balance of the club with the permanent weight or weights secured thereto is then rechecked to ensure that the putter has remained in balance. If, for any reason, the putter remains out of balance when the permanent weights are attached thereto, the above-identified balancing process is repeated until complete balancing and equilibrium is achieved. At this point, the putter is dynamically balanced to the same radius of gyration of such putter prior to relocation of its center of percussion. If a simulated grip weight was used during the balancing process as explained in U.S. Pat. No. 5,094,101, the simulated weight can now be removed and the actual grip member is positioned and secured to the outer periphery of the club shaft. Again, once the grip member is attached to the putter, the balance of the club should again be rechecked and, if necessary, rebalanced. Since the radius of gyration was held constant, the re-balanced putter has the same desired, optimal performance and feel as before, but, importantly, it now has its center of percussion location re-aligned so as to coincide with that point on the putter club face where the golfer makes contact with the golf ball during the putting stroke at or slightly above its horizontal centerline so as to achieve optimum roll characteristics. When using a putter balanced in the above-described manner, the resulting putt will have a truer line as well as a more predictable and repeatable roll and travel distance.

Adding weight to the reference putter 10 can be accomplished in many different ways, for example, by removing the grip 40 of the Putter 10 so as to expose the open end portion 42 of the shaft 44. Suitable weight material 46 corresponding in mass to an amount required to give the reference putter 10 the same radius of gyration as previously determined can be secured within the opening 42, the weight 46 being adjusted as required to match the selected radius of gyration value. Alternatively, a replacement grip 40 comprising a suitable material such as brass or the like can likewise be used as the additional weight as explained in Applicant's U.S. Pat. No. 5,094,101.

If the center of percussion location is offset both vertically and horizontally from the new golf ball contact point N as illustrated in FIG. 9, it is also possible to move the center of Percussion location laterally along axis 48 by adding weight to the putter head 18 at locations such as at the locations 50 shown in FIG. 10. The amount and location of weight added at the grip end portion of the putter 10 can then be adjusted so as to compensate for the weighted material added at 50 on the putter head 20 so as to maintain the desired radius of gyration value. Also, it is important to note that if the center of percussion location has to be moved downwardly along axis 36 (FIGS. 7 and 9), it may be necessary to add weight either below or adjacent to the sole Portion of the putter head 20 such as at 52 in order to achieve this end. Adding weight to the bottom of the putter head will increase the center of percussion length "q" thereby moving the center of percussion location downwardly towards the bottom of the club face. In contrast, adding weight to the grip portion of the putter will decrease the center of percussion length "q" thereby moving the center of percussion location upwardly towards the top of the club face.

If it is determined that the golfer's natural putting stroke is such that the golfer makes contact with the golf ball at or slightly above the horizontal centerline thereof, there is no need to angularly adjust the putter club face 18 as previously described with respect to FIG. 6 above. In this situation, the actual golf ball contact point on the putter club face 18 is compared to the center of percussion location, and the putter is balanced in accordance with the present invention as explained above so as to align the center of percussion location with that point on the putter club face where the golfer makes contact with the golf ball. Using the present balancing method will enable a golfer to consistently strike a golf ball at or slightly above its horizontal centerline during the golfer's natural putting stroke as illustrated in FIGS. 11 and 12. The new center of percussion location can be conveniently identified on the top portion of the putter head 20 in a conventional manner such as by using a groove or other mark 53 as illustrated in FIG. 12. The mark 53 will enable the golfer to consistently address and line up the putt such that the golfer will consistently strike the golf ball at its horizontal centerline location and at the center of percussion location on the putter club face.

The present method also enables a golfer to experimentally determine the optimal dynamic balance and characteristics for that particular golfer's putting style using one or more diagnostic or trial putters of the same or different constructional configurations. Each of the trial putters will be weighted and balanced differently and each may include a different center of percussion location. In addition, each of the trial putters may likewise include means for changing the angular orientation of the putter club face so as to effectively change the golf ball point of contact with the club face during the natural putting stroke of a particular golfer. When a trial putter having a balance and configuration which provides optimal performance and feel for that particular golfer is selected, the angular orientation of the putter club face can be adjusted as previously discussed with reference to FIGS. 5 and 6 so as to achieve optimum golf ball contact at or slightly above the horizontal centerline of the golf ball as previously explained. Once this is accomplished, the radius of gyration for the selected trial putter can be determined and the golfer's permanent putter can then be balanced to replicate the selected radius of gyration. This will install the dynamic characteristics of the selected trial putter into the golfer's permanent putter.

This particular procedure involves having a golfer select one or more trial putters each having a configuration and feel which the golfer finds desirable. The one or more trial putters may each have temporary weights added thereto around the grip end portion thereof so as to change the weight, feel and balance of such club which in turn changes the radius of gyration value associated therewith. Additionally, the trial putters can each have predetermined center of percussion locations on their respective putter club faces which can be the same as or different from one another. The location on the putter club face corresponding to the center of percussion location for each trial putter is preferably indicated on the top portion of the putter using a notch or other mark to enable the golfer to align a golf ball to be putted with the center of percussion of such putter.

When using a plurality of trial putters to determine the optimal dynamic balance of a golfer's own permanent putter, it is desirable to provide a number of trial putters having variously counterweighted grip ends and radii of gyration characteristics which are anticipated to be suitable for the majority of golfers. A golfer can then select, for instance, two or three trial putters that seem to provide the preferred, desired feel, the range of putter balances of the selected trial putters covering a span of radii of gyration values. The counterweights reflect the feel of the putter to the golfer and the radius of gyration establishes the dynamic performance. In other words, the placement of the counterweights gives the putter the desired feel when the putter is held in the static condition such as when addressing the ball and lining up the putt, and the radius of gyration maintains the desired feel during the dynamic conditions such as during the putting stroke. The total weight of the trial putter, including the counterweight and putter head weight, increase the total mass of the putter thereby increasing the moment of inertia at the putter head to give the trial putter a sufficiently heavy mass or weight for hitting the ball with a desired amount of force. However, moving the center of gravity of the putter closer to the grip end portion thereof gives the putter a lighter feel. This means that the putter will feel steady while addressing the ball and it will likewise feel steady throughout the putting stroke which will promote confidence and improve one's putting ability.

As mentioned above, the trial putters may each include temporary weights added thereto around the grip end thereof. Such temporary weights can be in the form of individual incremental weights 56, which are inserted into a cavity 58 located adjacent the grip end 60 of a trial putter 54 as shown in FIG. 13. The temporary weights can be maintained in the cavity 58 with a removable end cap 62 or with any other suitable means. Alternatively, the temporary weights can comprise a removable weighted grip 64 attachable to a trial putter 66 as shown in FIG. 14.

Once a golfer has selected several trial putters for possible final Preference, a number of golf balls will be putted with each of the trial putters, the golfer eliminating those trial putters which provide less desirable performance and feel until only the trial putter providing the best overall optimal performance and feel remains. Throughout this process of elimination, the amount of temporary weights for any trial putter may be increased or decreased, simply by adding or subtracting weights 56 to or from a trial putter 54, or alternatively, removing one weighted grip 64 and replacing it with another, as required. When the optimally dynamically balanced trial putter has been found, the center of gravity length, the center of percussion length, and the angular orientation of the putter club face are determined as previously explained. The radius of gyration value and the moment of inertia of the selected trial putter can now be calculated using Equations 1 and 2 above as previously explained.

A golfer's permanent putter can now be dynamically balanced so as to have the same selected radius of gyration and moment of inertia as the selected trial putter. First of all, since the angular orientation of the selected trial putter club face allows the golfer to consistently strike the golf ball at its optimum location as previously explained, the golfer's permanent putter club face is modified to replicate the same angular orientation as determined through the use of the selected trial putter. Once this is accomplished, the golf ball contact point location on the permanent putter club face as well as the center of percussion location are determined for the golfer's permanent putter in the same manner as previously described. Once these two locations on the permanent putter club face are determined, such locations are compared as previously explained. If these two locations do not coincide, then the center of percussion location can be moved so as to coincide with the golf ball contact point in the same manner as previously described with reference to the above discussion centering around FIGS. 7 and 9. Since the new center of percussion length "q" is now known and can be measured with respect to the permanent putter, and since the radius of gyration value is also known, a new center of gravity length "r" for the permanent putter can be calculated through the use of Equation 1 above as previously explained. Once this new center of gravity length "r" is determined, the permanent putter can be balanced about this new center of gravity location by adding weight to either the grip end Portion of the putter or the putter head as previously explained. This re-balancing about the new center of gravity location can be accomplished by known means as previously explained. If desirable, the moment of inertia of the selected trial putter could likewise be matched to the moment of inertia of the permanent putter being re-balanced by adding or subtracting weight at the new center of gravity location for the permanent putter. This procedure precisely replicates the performance and feel of the selected trial putter.

Although the present method is centered around adjusting the actual golf ball contact point on the putter club face to an optimum point of contact location wherein the golfer will consistently strike the golf ball at or slightly above its horizontal centerline as previously explained, it is also recognized that the present invention enables one to adjust the center of percussion of the golfer's permanent putter to any other location on the putter club face which corresponds to a particular Point of contact location preferred by that particular golfer for striking the golf ball during that golfer's particular putting stroke. If the golfer has a preferred location on the putter club face for striking the golf ball, all of the methods discussed above can be adapted so as to adjust the center of percussion of the putter to be balanced such that it corresponds to such preferred contact point on the putter club face.

It is also recognized that the above-discussed method for dynamically balancing golf putters is equally applicable to dynamically balancing a wide variety of other hand held implements such as baseball bats, hammers, axes, and any other tool wherein the implement's use requires a swinging motion. Here again, the objective is to reposition the center of percussion of the particular implement to a location which coincides with the actual point of contact of such implement with the particular object being struck. For example, in the case of a baseball bat, moving the center of percussion of the bat to the optimum location on the bat surface for striking a baseball. Similarly, in the case of a hammer or ax, moving the center of percussion of such implement to the optimum location for driving nails or striking the particular object for which the implement is being utilized. Importantly, this repositioning of the center of percussion is accomplished while controlling the radius of gyration value selected for that particular implement. Here again, the user of such implement must select an implement which meets the user's particular performance and feel characteristics based upon the user's natural swinging motion of such impelement. Once the reference implement is selected as hereinbefore discussed, the center of percussion length, the center of gravity length, and the radius of gyration can be determined. The implement can then be balanced in accordance with the present invention as hereinbefore described using the radius of gyration value as the controlling parameter. Radius of gyration balancing of any hand held implement as described above will improve the efficiency and ease of handling of such implement.

It may be that the center of percussion location for a particular implement is already ideally located but yet the implement itself is uncomfortable to use for a variety of reasons, one of which may be the fact that many such hand held implements are head heavy weightwise. This presents problems during the swinging motion. In this situation, using Equation 1 above, it is also possible to change both the radius of gyration value "K" as well as the center of gravity length "r" while still holding the ratio "$K^2/r$" constant or substantially constant thereby holding the center of percussion length at or near its desired location. This will enable a user to adjust the radius of gyration value as well as the weight or mass and moment of inertia of the implement to achieve a more comfortable feel during use while still maintaining the center of percussion location at or near its optimal point of contact for use. In effect, one can considerably change the weight distribution of the implement without substantially changing its radius of gyration. This is likewise true with respect to the present balancing method discussed above for balancing golf putters. Once the desired center of percussion length "q" is determined, both the radius of gyration "K" and the center of gravity length "r" may be varied so long as the ratio "$K^2/r$" remains substantially constant.

Thus, there has been shown and described a novel method for dynamically balancing golf putters and other hand held implements, which method fulfills all of the objects and advantages sought therefor. Many changes, modifications, variations, and other uses and applications of the present method will, however, become apparent to those skilled in the art after considering this specification and the accompanying drawings. All such changes, modifications, variations, and other uses and applications which do not depart from the spirit and scope of the present invention are deemed to be covered by the invention which is limited only by the claims which follow.

What is claimed is:

1. A method for dynamically balancing a golf putter, said method comprising the following steps:
   (a) having a golfer select a particular putter to be balanced, said putter having an inherent center of gravity length, an inherent center of percussion length, and an inherent radius of gyration;

(b) determining the radius of gyration of said selected putter;

(c) determining the center of percussion location on the club face of said selected putter;

(d) determining where on the putter club face a golfer consistently makes contact with a golf ball during that golfer's natural putting stroke;

(e) comparing the center of percussion location determined in step (c) above with that location on said putter club face determined in step (d) above;

(f) determining a new center of percussion length for said selected putter based upon said selected putter having its center of Percussion located at that location on the putter club face where said golfer consistently makes contact with a golf ball during that golfer's natural putting stroke;

(g) determining the new center of gravity location for said selected putter based upon its new center of percussion length determined in step (f) above and the radius of gyration previously determined for (h) balancing said selected putter about its new center of gravity location so as to give said putter the same radius of gyration as previously determined.

2. A method for dynamically balancing a golf putter, said method comprising the following steps:

(a) having a golfer select a particular putter to be balanced, said putter having an inherent center of gravity length, an inherent center of percussion length, and an inherent radius of gyration;

(b) determining the radius of gyration of said selected putter;

(c) determining where on a golf ball a golfer consistently makes contact with such golf ball during that golfer's natural putting stroke using said selected putter;

(d) angularly adjusting the club face of said selected putter, if necessary, to enable said golfer to consistently make contact with a golf ball at or slightly above its horizontal centerline during that golfer'- natural putting stroke;

(e) determining the center of percussion location of said selected putter as modified in accordance with step (d) above;

(f) determining where on the club face of said modified Putter said golfer makes contact with a golf ball at or slightly above its horizontal centerline during that golfer's natural putting stroke;

(g) comparing the center of percussion location of said modified putter determined in step (e) above with that location on the club face of said modified putter determined in step (f);

(h) determining a new center of percussion length for said modified putter based upon said modified putter having its center of percussion located at that location where said golfer makes contact with a golf ball at or slightly above its horizontal centerline during that golfer's natural putting stroke;

(i) determining the new center of gravity location for said modified putter based upon its new center of percussion length determined in step (h) above and the radius of gyration previously determined for said selected putter in step (b) above; and (j) balancing said modified putter about its new center of gravity location so as to give said putter the same radius of gyration as previously determined.

3. An improved method for dynamically balancing a golf putter, said method comprising the following steps:

(a) selecting a radius of gyration value;

(b) determining where on a golf ball a particular golfer consistently makes contact with such golf ball during that golfer's natural putting stroke using said putter;

(c) adjusting the angle of orientation of the club face of said putter, if necessary, such that a golfer consistently makes contact with the golf ball at or slightly above its horizontal centerline during that golfer's natural putting stroke;

(d) determining where on said putter club face said golfer consistently makes contact with a golf ball at its horizontal centerline during that golfer's natural putting stroke;

(e) determining the center of percussion length for said putter as modified in accordance with step (c) above;

(f) determining the new center of gravity location for said modified putter based upon the center of percussion length determined in step (e) above and the selected radius of gyration value; and (g) balancing said putter about its new center of gravity location.

4. A method for dynamically balancing a golf putter, said method comprising the following steps:

(a) having a golfer select a particular putter to be balanced, said putter having an inherent center of gravity length, an inherent center of percussion length, and an inherent radius of gyration;

(b) determining the radius of gyration of said selected putter;

(c) determining where on a golf ball a golfer consistently makes contact with such golf ball during that golfer's natural putting stroke using said selected putter;

(d) angularly adjusting the club face of said selected putter, if necessary, to enable said golfer to consistently make contact with a golf ball at or slightly above its horizontal centerline during that golfer's natural putting stroke;

(e) determining the center of percussion location of said selected putter as modified in accordance with step (d) above;

(f) determining where on the club face of said modified putter said golfer makes contact with a golf ball at or slightly above its horizontal centerline during that golfer's natural putting stroke;

(g) comparing the center of percussion location of said modified putter determined in step (e) above with that location on the club face of said modified putter determined in step (f);

(h) determining a new center of percussion length for said modified putter based upon said modified putter having its center of Percussion located at that location where said golfer makes contact with a golf ball at or slightly above its horizontal centerline during that golfer's natural putting stroke;

(i) using the equation "$q = K^2/r$" where
  $q$ = length from the center of percussion of the putter to the grip end axis of rotation,
  $K$ = radius of gyration of the putter, and
  $r$ = length from the center of gravity of the putter to the grip end axis of rotation,
  selecting a radius of gyration value "$K$" and a center of gravity length "$r$" which best suits that Particular golfer's needs and comfortability such that the ratio "$K^2/r$" remains equal to the new center of percussion length for said modified putter determined in step (h) above; and (j) balancing said modified putter about the center of gravity length "r" selected in step (i) above.

5. A method for dynamically balancing a golf putter, said method comprising the following steps:
   (a) having a golfer select a preferred trial putter having a predetermined center of gravity length, a predetermined center of percussion location and length, and an inherent radius of gyration;
   (b) determining the radius of gyration of said trial putter;
   (c) determining where on the trial putter club face a golfer consistently makes contact with a golf ball during that golfer's natural putting stroke;
   (d) comparing the center of percussion location determined in step (a) above with that location on said trial putter club face determined in step (c) above;
   (e) determining a new center of percussion length for said trial putter based upon said trial putter having its center of percussion located at that location where said golfer consistently makes contact with a golf ball during that golfer's natural putting stroke;
   (f) determining a new center of gravity location for a Putter to be balanced based upon the center of percussion length determined in step (e) above for said trial putter and the radius of gyration determined in step (b) above for said trial putter; and
   (g) balancing the putter to be balanced about its new center of gravity location so as to give said putter the same radius of gyration and center of percussion length as said trial putter.

6. The method of claim 6 further comprising the following additional steps:
   (a) determining the moment of inertia of the trial putter; and
   (b) balancing said putter to be balanced so as to have the same moment of inertia value as said trial putter.

7. A method for balancing golf putters comprising the following steps:
   (a) having a golfer select a first putter having a club face configuration enabling said golfer to consistently make contact with a golf ball at or slightly above its horizontal centerline during that golfer's natural putting stroke using said first putter;
   (b) determining the radius of gyration of said first putter;
   (c) configuring the club face of a second putter to be balanced so as to replicate the club head configuration of said first putter;
   (d) determining where on the club face of said second putter said golfer makes contact with a golf ball at or slightly above its horizontal centerline during that golfer's natural putting stroke;
   (e) determining the center of percussion location of said second putter;
   (f) comparing the center of percussion location of said second putter determined in step (e) above with that location on said second putter club face determined in step (d) above;
   (g) determining a new center of percussion length for said second putter based upon said second putter having its center of percussion located at that location where said golfer makes contact with a golf ball at or slightly above its horizontal centerline during that golfer's natural putting stroke;
   (h) determining the new center of gravity location for said second putter based upon its new center of percussion length and the radius of gyration previously determined for said first putter; and
   (i) balancing said second putter about its new center of gravity location.

8. A method for determining the optimal dynamic balance of a golf putter, said method comprising the following steps:
   (a) having a golfer select a trial putter having a Predetermined center of gravity length, a Predetermined center of percussion length, and an inherent radius of gyration;
   (b) determining where on a golf ball a golfer consistently makes contact with such golf ball during that golfer's natural putting stroke using said trial putter;
   (c) angularly adjusting the club face of said trial putter, if necessary, to enable said golfer to consistently make contact with a golf ball at or slightly above its horizontal centerline during that golfer's natural putting stroke;
   (d) determining the radius of gyration of said trial putter as modified in accordance with step (c) above;
   (e) configuring the club face of the putter to be balanced to replicate the angular orientation of the club face of said trial putter;
   (f) determining where on the club face of the putter to be balanced said golfer makes contact with a golf ball at or slightly above its horizontal centerline during that golfer's natural putting stroke;
   (g) determining the center of percussion location of said putter to be balanced as modified in accordance with step (e) above;
   (h) comparing the center of percussion location of said putter to be balanced determined in step (g) above with that location on the club face of said putter to be balanced determined in step (f) above;
   (i) determining a new center of percussion length for said putter to be balanced based upon said putter having its center of percussion located at that location where said golfer makes contact with a golf ball at or slightly above its horizontal centerline during that golfer's natural putting stroke;
   (j) determining the new center of gravity location for said putter to be balanced based upon its new center of percussion length determined in step (i) above and the radius of gyration previously determined for said trial putter in step (d) above; and
   (k) balancing said putter to be balanced about its new center of gravity location.

9. A method for dynamically balancing a hand held implement, said method comprising the following steps:
   (a) selecting a predetermined radius of gyration value for said implement to be balanced;
   (b) determining the center of percussion location of said implement;
   (c) determining where on said implement a user desires to make contact with the particular object being struck with said implement;
   (d) comparing the center of percussion location determined in step (b) above with that location on said implement determined in step (c) above;
   (e) determining a new center of percussion length for said implement based upon said implement having its center of percussion located at that location where said user desires to make contact with the particular object for which said implement is being utilized;

(f) determining the new center of gravity location for said implement based upon its new center of percussion length determined in step (e) above and the selected radius of gyration value; and (g) balancing said implement about its new center of gravity location.

10. A method for dynamically balancing a hand held implement, said method comprising the following steps:

(a) determining the center of percussion length, the center of gravity length, and the radius of gyration of the implement to be balanced;

(b) using the equation "$q = K^2/r$" wherein
 q = length from the center of percussion of the implement to the grip end axis of rotation,
 K = radius of gyration of the implement, and
 r = length from the center of gravity of the implement to the grip end axis of rotation,
 selecting a new radius of gyration value "K" and a new center of gravity length "r" which best suits the comfortability of the user, the new radius of gyration value and the new center of gravity length being selected such that the ratio "$K^2/r$" remains substantially equal to the original predetermined center of percussion length for said implement; and (c) balancing said implement about its new center of gravity length "r" determined in step (b) above.

11. The method of claim 10 wherein the new radius of gyration value "K" and the new center of gravity length "r" selected to meet the comfortability requirements of said user are such that the ratio "$K^2/r$" remains close, but not equal, to the original predetermined center of percussion length of said implement.

* * * * *

UNITED STATES PATENT AND TRADEMARK OFFICE
CERTIFICATE OF CORRECTION

PATENT NO. : 5,277,059
DATED : January 11, 1994
INVENTOR(S) : Herman A. Chastonay It is certified that error appears in the above-indentified patent and that said Letters Patent is hereby corrected as shown below:

Column 2, line 59, after "club" insert --.--.

Column 7, line 34, after "Club" delete --,--.

Column 9, line 68, delete "1" and insert therefor --ball--.

Column 17, line 20, after "for" insert --said selected putter in step (b) above; and--.

Column 19, line 5, before "having" (first occurrence) insert --(a)--.

Column 19, line 34, "6" should be --5--.

Signed and Sealed this

Twenty-first Day of June, 1994

*Attest:*

BRUCE LEHMAN

*Attesting Officer*    Commissioner of Patents and Trademarks